United States Patent
Kumar C S

(10) Patent No.: US 9,485,198 B1
(45) Date of Patent: *Nov. 1, 2016

(54) METHODS AND APPARATUS FOR MULTICAST TRAFFIC FAILOVER IN A NETWORK

(71) Applicant: Juniper Networks, Inc., Sunnyvale, CA (US)

(72) Inventor: Sunil Kumar C S, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/009,216

(22) Filed: Jan. 28, 2016

Related U.S. Application Data

(63) Continuation of application No. 14/721,887, filed on May 26, 2015, now Pat. No. 9,253,074, which is a continuation of application No. 13/627,061, filed on Sep. 26, 2012, now Pat. No. 9,059,901.

(51) Int. Cl.
*G06F 11/00* (2006.01)
*H04J 1/16* (2006.01)
*H04L 12/26* (2006.01)
*H04L 12/939* (2013.01)
*H04L 12/751* (2013.01)
*H04L 12/761* (2013.01)

(52) U.S. Cl.
CPC .......... *H04L 49/557* (2013.01); *H04L 45/02* (2013.01); *H04L 45/16* (2013.01)

(58) Field of Classification Search
CPC ........ H04L 45/02; H04L 41/12; H04L 45/00
USPC ................ 370/255, 256, 390, 254, 216–228
See application file for complete search history.

(56) References Cited

U.S. PATENT DOCUMENTS

| | | | |
|---|---|---|---|
| 5,999,530 A | 12/1999 | LeMaire et al. | |
| 6,169,741 B1 | 1/2001 | LeMaire et al. | |
| 8,724,533 B2 | 5/2014 | Thubert et al. | |
| 9,059,901 B1 * | 6/2015 | Kumar C S | H04L 45/02 |
| 9,253,074 B1 * | 2/2016 | Kumar C S | H04L 45/02 |
| 2003/0043755 A1 | 3/2003 | Mitchell | |

(Continued)

OTHER PUBLICATIONS

The Institute of Electrical and Electronics Engineers, Inc., "IEEE Standard for Local and Metropolitan Area Networks: Media Access Control (MAC) Bridges" IEEE Std 802. 1D-2004 (2004), pp. 1-4.

(Continued)

*Primary Examiner* — Chuong T Ho
(74) *Attorney, Agent, or Firm* — Cooley LLP

(57) ABSTRACT

An apparatus includes an access switch having a set of ports and configured to be operatively coupled to a multicast router via a first port from the set of ports. The access switch is configured to be associated with a network associated with the multicast router, and designate the first port as a multicast-router interface during a time period. The access switch is configured to send a message to the multicast router via each port from the set of ports in response to an indication of a change in a topology of the network after the time period. The access switch is configured to designate a second port from the set of ports as the multicast-router interface and dedesignate the first port as the multicast-router interface in response to receiving, via the second port and in response to the message, a signal from the multicast router.

20 Claims, 4 Drawing Sheets

(56) References Cited

U.S. PATENT DOCUMENTS

| | | | |
|---|---|---|---|
| 2003/0120817 A1* | 6/2003 | Ott | H04L 12/1859 709/249 |
| 2006/0002391 A1 | 1/2006 | Takihiro et al. | |
| 2006/0164984 A1* | 7/2006 | Rao | H04L 12/185 370/230 |
| 2006/0176804 A1* | 8/2006 | Shibata | H04L 12/185 370/217 |
| 2007/0019646 A1* | 1/2007 | Bryant | H04L 12/1868 370/390 |
| 2007/0091890 A1 | 4/2007 | Radhakrishnan et al. | |
| 2008/0219237 A1 | 9/2008 | Thubert et al. | |
| 2009/0028044 A1* | 1/2009 | Windisch | H04L 12/1877 370/225 |
| 2009/0213855 A1 | 8/2009 | Xu | |
| 2011/0305239 A1 | 12/2011 | Chandrashekharachar Suvarneshwar | |
| 2012/0075988 A1* | 3/2012 | Lu | H04L 45/02 370/218 |
| 2013/0003527 A1 | 1/2013 | Huang et al. | |
| 2013/0064245 A1 | 3/2013 | Wei et al. | |
| 2013/0329727 A1 | 12/2013 | Rajagopalan et al. | |
| 2014/0313880 A1* | 10/2014 | Lu | H04L 45/02 370/218 |

OTHER PUBLICATIONS

The Institute of Electrical and Electronics Engineers, Inc., "IEEE Standard for Local and Metropolitan Area Networks—Common specifications: Part 3: Media Access Control (MAC) Bridges—Amendment 2: Rapid Reconfiguration" IEEE Std 802. 1 w-2001 (2001), pp. 1-5.

Office Action for U.S. Appl. No. 13/627,061 dated Apr. 11, 2014.

Office Action for U.S. Appl. No. 14/721,887 dated Jul. 17, 2015.

* cited by examiner

METHODS AND APPARATUS FOR MULTICAST TRAFFIC FAILOVER IN A NETWORK

CROSS-REFERENCE TO RELATED PATENT APPLICATIONS

This patent application is a Continuation of and claims priority to and the benefit of U.S. patent application Ser. No. 14/721,887, filed May 26, 2015 and entitled, "METHODS AND APPARATUS FOR MULTICAST TRAFFIC FAILOVER IN A NETWORK," which in turn is a Continuation of and claims priority to and the benefit of U.S. patent application Ser. No. 13/627,061, filed Sep. 26, 2012 and entitled "METHODS AND APPARATUS FOR MULTICAST TRAFFIC FAILOVER IN A NETWORK." The entire contents of the aforementioned applications are herein expressly incorporated by reference.

BACKGROUND

Some embodiments described herein relate generally to networks used for multicasting traffic, and, in particular, to methods and apparatus for enabling a quick multicast traffic failover in a network.

Some known networks used for multicasting traffic include switches enabled with a snooping mechanism (e.g., Internet Group Management Protocol (IGMP)-snooping, Multicast Listener Discovery (MLD)-snooping) and a network protocol (e.g., the Spanning Tree Protocol (STP)) defining a topology for the network. Such a switch typically has a port designated as a multicast-router interface for forwarding multicast traffic to a multicast router (e.g., by IGMP-snooping or MLD-snooping). When the topology changes, the port may not function as a multicast-router interface anymore, thus another port of the switch is designated as a new multicast-router interface. The new multicast-router interface, however, typically is not immediately designated in the snooping mechanism after the change of the topology. As a result, a loss of multicast data can be caused to the receivers that are receiving data through the multicast router from the switch.

Accordingly, a need exists for a solution that can enable improved failover in the topology of the network such that the loss of multicast data can be reduced in case of a change of a multicast-router interface.

SUMMARY

An apparatus includes an access switch having a set of ports and configured to be operatively coupled to a multicast router via a first port from the set of ports. The access switch is configured to be associated with a network associated with the multicast router, and designate the first port as a multicast-router interface during a time period. The access switch is configured to send a message to the multicast router via each port from the set of ports in response to an indication of a change in a topology of the network after the time period. The access switch is configured to designate a second port from the set of ports as the multicast-router interface and dedesignate the first port as the multicast-router interface in response to receiving, via the second port and in response to the message, a signal from the multicast router.

DETAILED DESCRIPTION

In some embodiments, an apparatus includes an access switch having a set of ports. The access switch is configured to be operatively coupled to a multicast router via a data path including a first port from the set of ports. The access switch is configured to be associated with a network associated with the multicast router. The access switch is configured to designate the first port as a multicast-router interface during a time period.

The access switch is configured to send a message to the multicast router via each port from the set of ports in response to an indication of a change in a topology of the network after the time period followed by a local topology convergence. In some embodiments, the message can be an Internet Group Management Protocol (IGMP) group-specific query, or a Multicast Listener Discovery (MLD) query. In some embodiments, the message can be sent and/or flooded multiple times (e.g., 2-3 times) such that the message reaches each device in the topology at least once based on a complete topology convergence. In some embodiments, the access switch can be configured to receive or generate the indication of the change in the topology in response to a Spanning Tree Protocol (STP) convergence. Such an indication of the change can be, for example, an STP Topology Change Notification (TCN). Furthermore, in such embodiments, the access switch can be configured to send the message to the multicast router via each port from the set of ports based on each port from the set of ports being in an STP forward (FWD) state after the topology converges.

The access switch is also configured to designate a second port from the set of ports as the multicast-router interface and dedesignate the first port as the multicast-router interface in response to receiving, via the second port and in response to the message, a signal from the multicast router.

As used herein, a module can be, for example, any assembly and/or set of operatively-coupled electrical components, and can include, for example, a memory, a processor, electrical traces, optical connectors, software (stored in and/or executing in hardware) and/or the like.

As used herein, the singular forms "a," "an" and "the" include plural referents unless the context clearly dictates otherwise. Thus, for example, the term "a distribution switch" is intended to mean a single distribution switch or a combination of distribution switching devices.

Figure 1:
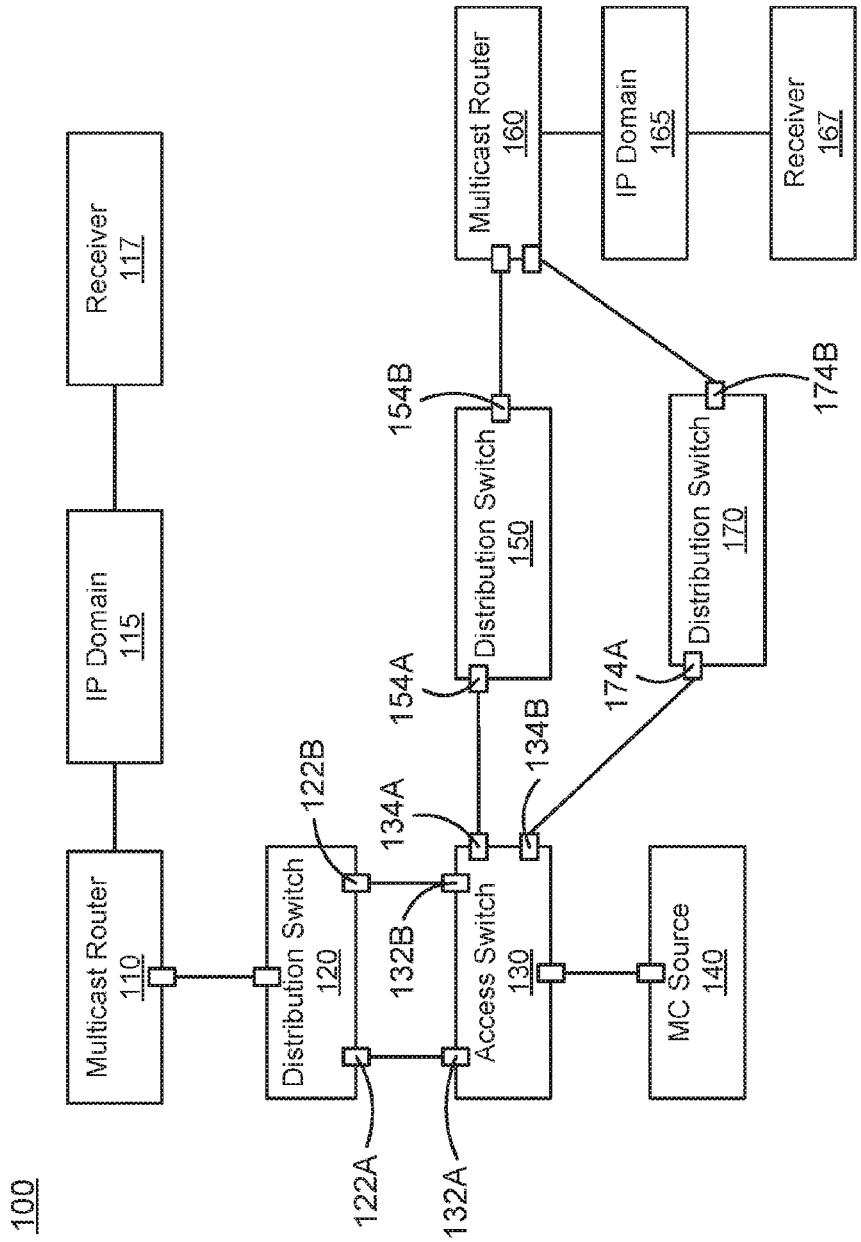
FIG. 1 is a schematic illustration of a network including switches, multicast routers and other devices, according to an embodiment.

FIG. 1 is a schematic illustration of a network 100 including switches, multicast routers and other devices, according to an embodiment. The network 100 includes a multicast source 140, an access switch 130, distribution switches 120, 150, 170, multicast routers 110, 160, Internet Protocol (IP) domains 115, 165, and receivers 117, 167. In some embodiments, the network 100 can include more or less devices than those shown in FIG. 1. For example, the network 100 can include multiple access switches, each of which is coupled to one or more multiple multicast sources. For another example, the network 100 can have any number of distribution switches, multicast routers, receivers, or any other type of devices operatively coupled to the multicast source 140 and the access switch 130. The network 100 can be any network that enables data (e.g., data packets, data cells) to be sent through, routed, switched, and/or forwarded within the network. Particularly, the network 100 can be any network where multicast data traffic originated at a multicast source (e.g., the multicast source 140) can be sent, via multicasting, to multiple receivers (e.g., the receivers 117, 167). In some embodiments, the network 100 can be, for example, a virtual local area network (VLAN), an enterprise network, a switched local area network (LAN), the Internet, or any other type of switched network or combination of various types of switched networks.

In some embodiments, the devices in the network 100 can be directly or operatively coupled to the remaining devices in the network 100 using any suitable connection such as, for example, an optical connection (e.g., an optical cable and optical connectors), an electrical connection (e.g., an electrical cable and electrical connectors), a wireless connection (e.g., a wireless transceiver), and/or the like. Thus, a device in the network 100 (e.g., the multicast source 140) can be configured to send data (e.g., multicast data packets) to or receive data from another device (e.g., the receivers 117, 167) in the network 100. In some embodiments, data can be transmitted within the network 100 over different types of links (e.g., electrical links, optical links, wireless links) based on one or more protocols (e.g., an Ethernet protocol, a multi-protocol label switching (MPLS) protocol, a Fibre Channel protocol, a Fibre-Channel-over Ethernet protocol, an infiniband-related protocol, a cell-based protocol, etc.).

In some embodiments, a connection between two devices (e.g., the multicast source 140 and the access switch 130) in the network 100 can be a direct link. Such a connection can be said to be a single physical hop link. In other embodiments, two devices (e.g., the multicast source 140 and the receiver 117, 167) in the network 100 can be operatively coupled through one or more intervening nodes (e.g., the access switch 130, the distribution switch 120, 150, 170, the multicast router 110, 160, the IP domain 115, 165). Such a connection can be said to be a multiple physical hop link.

In some embodiments, the network 100 can be used to transmit multicast data from, for example, a multicast source (e.g., the multicast source 140) to, for example, multiple receiving devices (e.g., the receivers 117 and 167). As shown in FIG. 1, the multicast source 140 can be configured to originate multicast data destined to the receiver 117 and 167. The multicast source 140 can then be configured to send the multicast data, through the access switch 130, the distribution switch 120, the multicast router 110 and the IP domain 115, to the receiver 117. Similarly, the multicast source 140 can be configured to send the same multicast data, through the access switch 130, the distribution 150 and/or the distribution 170, the multicast router 160 and the IP domain 165, to the receiver 167.

The multicast source 140 can be any device that can originate multicast data destined to a receiver (e.g., the receiver 117, 167) or any other receiving device in or out of the network 100. The multicast source 140 can be, for example, a host device, a peripheral processing device, a server device, a storage device, a workstation, and/or the like. In some embodiments, the multicast source 140 can also receive data, for example, sent from a receiver. Accordingly, the multicast source 140 can send data (e.g., multicast data) to and receive data from the receivers 117, 167 via the access switch 130. In some embodiments, the multicast source 140 can also send data to and/or receive data from other devices (shown or not shown in FIG. 1) operatively coupled to the multicast source 140, via or not via the access switch 130.

As shown in FIG. 1, after the multicast source 140 generates some multicast data destined to the receiver 117 and/or the receiver 167, the multicast source 140 can be configured to send the multicast data to the access switch 130. The access switch 130 can be any switching device configured to switch data (e.g., data packets) that is received from an originating device (e.g., the multicast source 140) and destined to one or more destination devices (e.g., the receiver 117 and/or 167). Thus, the access switch 130 can provide a device (e.g., the multicast source 140) an access to the remaining devices of the network 100. In some embodiments, the access switch 130 can be configured to switch multicast data received from the multicast source 140 and destined to the receivers 117 and 167, as described in detail herein. In such embodiments, the access switch 130 can be configured to transmit (multicast) data received from the multicast source 140 to the distribution switch 120, 150, and/or 170, and similarly, transmit data received from the distribution switch 120, 150, and/or 170 to the multicast source 140.

In some embodiments, the access switch 130 can be a switching device (e.g., a repeater, a hub, a layer-2 switch, a bridge router (brouter), a layer-3 switch, etc.) at an access layer (in a hierarchical internetworking model including an access layer, a distribution layer, and a core layer) of a network. In some embodiments, the access switch 130 can be a combination of hardware modules and software modules (stored in memory and/or executing in hardware). In some embodiments, for example, the access switch 130 can include a field-programmable gate array (FPGA), an application specific integrated circuit (ASIC), a digital signal processor (DSP) and/or the like. Details of the inner structure of an access switch are shown and described with respect to FIG. 2.

As shown in FIG. 1, the multicast data originated from the multicast source 140 can be sent from the access switch 130 to the distribution switch 120, 150, and/or 170. The distribution switches 120, 150, 170 can be any device that can be used to distribute data within a network. In some embodiments, the distribution switch 120, 150 or 170 can be a switching device (e.g., a bridge, a bridge router (brouter), a layer-3 switch, etc.) at a distribution layer (in the three-layer hierarchical internetworking model) of a network. Specifically, the distribution switch 120, 150 or 170 can be used to couple the multicast source 140 and the access switch 130 to the IP domain 115 or the IP domain 165. Similarly stated, the distribution switches 120, 150 and 170 can be configured to transmit data received from the access switch 130 to the multicast router 110 or 160, and transmit data received from the multicast router 110 or 160 to the access switch 130.

Similar to the access switch 130, the distribution switch 120, 150 or 170 can be a combination of hardware modules and software modules (stored in memory and/or executing in hardware). In some embodiments, each access switch or distribution switch in the network 100 can be an assembly of electronic components and circuitry. In some embodiments, for example, each access switch or distribution switch can include a FPGA, an ASIC, a DSP and/or the like. In some other embodiments, multiple access switches and/or distribution switches can be contained on a single ASIC or a single chip package. In still other embodiments, each access switch or distribution switch can be an assembly of discrete electrical components. Additionally, in some embodiments, the access switch 130 and the distribution switches 120, 150 and 170 can be switching devices used within layer 2 (i.e., the data link layer) of the seven-layer Open Systems Interconnection (OSI) model of computer networking (or equivalently, the link layer of the Transmission Control Protocol (TCP)/Internet Protocol (IP) reference model).

As shown in FIG. 1, the multicast data originated from the multicast source 140 can be sent from the distribution switch 120, 150, and/or 170 to the receiver 117 and/or 167 via the multicast router 110 and/or 160, and the IP domain 115 and/or 165. The multicast router 110 or 160 can be any type of routing device that can determine the routing or distribution of received data (e.g., multicast data) and forward the data toward the intended destination accordingly. The IP domain 115 or 165 can represent an IP subnet associated with a specific domain within the network 100. In some embodiments, the IP domain 115 or 165 can include multiple devices, each of which has an IP address within the IP subnet associated with the corresponding IP domain. The devices included in the IP domain 115 or 165 can be, for example, server devices, storage devices, compute devices, switching devices, peripheral processing devices, etc.

In some embodiments, the IP domain 115 or 165 can be an IP domain different from the IP domain that includes the multicast source 140, the access switch 130, and the distribution switches 120, 150, 170. Thus, the multicast router 110 can be situated at the boundary of the IP domain 115 and the IP domain including the multicast source 140, and similarly, the multicast router 160 can be situated at the boundary of the IP domain 165 and the IP domain including the multicast source 140. In such embodiments, the multicast router 110 or 160 can (operatively) couple devices in two different IP subnets, and route data between the devices within the different IP subnets. The multicast router 110 or 160 can be a switching and/or routing device used within layer 3 (i.e., the network layer) of the OSI model of computer networking (or equivalently, the Internet layer of the TCP/IP reference model).

In some embodiments, the multicast router 110 or 160 can be configured to receive multicast data packets originated from the multicast source 140 and destined to the receiver 117 and/or 167. Based on information contained in the received multicast data packets, the multicast router 110 or 160 can be configured to route the received multicast data packets to a device (e.g., a distribution switch, an access switch) within the IP domain 115 or 160, from which the multicast data packets can be further forwarded to the receiver 117 and/or 167.

For example, the multicast router 110 can receive, via the access switch 130 and the distribution switch 120, multicast data packets destined to the receiver 117 and originated from the multicast source 140, which is within an IP subnet. Based on the received multicast data packets, the multicast router 110 can be configured to route the received multicast data packets to the receiver 117 through the IP domain 115, which represents a different IP subnet from the IP subnet that includes the multicast source 140.

For another example, the multicast router 160 can receive, via the access switch 130 and the distribution switch 150 or the distribution switch 170, multicast data packets destined to the receiver 167 and originated from the multicast source 140. Based on the received multicast data packets, the multicast router 160 can be configured to route the received multicast data packets to the receiver 167 through the IP domain 165, which represents a different IP subnet from the IP subnet that includes the multicast source 140.

The receiver 117 or 167 can be any device that can act as a designated destination of multicast data (e.g., originated at the multicast source 140), and can receive multicast data. Similar to the multicast source 140, the receiver 117 or 167 can be, for example, a host device, a peripheral processing device, a server device, a storage device, a workstation, and/or the like. As shown in FIG. 1, the receiver 117 can receive multicast data sent from the multicast source 140 via the access switch 130, the distribution switch 120, the multicast router 110 and one or more devices within the IP domain 115. Similarly, the receiver 167 can receive multicast data sent from the multicast source 140 via the access switch 130, the distribution switch 150 and/or the distribution switch 170, the multicast router 160 and one or more devices within the IP domain 165. In some embodiments, the receiver 117 or 167 can be included in the IP domain 115 or 165, respectively. In some embodiments, the receiver 117 or 167 can be directly coupled to the multicast router 110 or 160, respectively.

In some embodiments, more or less devices than those shown in FIG. 1 can be situated between a multicast source and a receiver. For example, more than one distribution switch, multicast router, and/or IP domain can be included in a data path that connects a multicast source and a receiver within the network 100. For another example, a multicast source can be coupled to a receiver, which is in the same IP subnet with the multicast source, via an access switch and a distribution switch. In such an example, the data path connecting the multicast source and the receiver does not need to include a multicast router or any device associated with another IP subnet.

In some embodiments, the access switch 130 can include multiple ports through which the access switch 130 can transmit data to and/or receive data from other devices. As shown in FIG. 1, the access switch 130 includes a port connected to a port of the multicast source 140; a port 134A connected to a port 154A of the distribution switch 150; a port 134B connected to a port 174A of the distribution switch 170; and ports 132A, 132B connected to ports 122A, 122B, respectively, of the distribution switch 120. Thus, the access switch 130 can be configured to communicate with other devices (e.g., the receivers 117, 167) over multiple data paths. Similarly stated, multiple data paths exist, within the network 100, between the access switch 130 and some other devices such as the receivers 117 and 167. As a result, the access switch 130 can be configured to transmit multicast data received from the multicast source 140 to the receivers 117, 167, and/or other receiving devices. For example, to send a multicast data packet destined to the receiver 117 and the receiver 167, the access switch 130 can be configured to send a copy of the multicast data packet to the distribution switch 120 via the port 132A (i.e., to the port 122A of the distribution switch 120) or via the port 132B (i.e., to the port 122B of the distribution switch 120). Similarly, the access switch 130 can be configured to send another copy of the multicast data packet to the distribution switch 150 via the port 134A, or to the distribution switch 170 via the port 134B.

In some embodiments, a network protocol can be used to discover and/or ensure a loop-free topology for a switched network (e.g., a LAN, a VLAN). Such a network protocol can be, for example, the spanning tree protocol (STP), Rapid STP (RSTP), the VLAN STP (VSTP), the multiple STP (MSTP), etc. In the example of FIG. 1, the STP can be implemented to ensure a loop-free topology for the network 100, such that the multicast source 140 can be coupled to other devices (e.g., the multicast routers 110, 160) via one or more loop-free data paths. For example, the multicast source 140 can be coupled to the multicast router 110 via a loop-free data path including the access switch 130 and the distribution switch 120. For another example, the multicast source 140 can be coupled to the multicast router 160 via two loop-free data paths: one path including the access switch 130 and the distribution switch 150 and the other path including the access switch 130 and the distribution switch 170.

In some embodiments, an access switch (e.g., the access switch 130) configured to support the STP in a switched network (e.g., the network 100) can be referred to as an STP-enabled access switch. A port (e.g., the port 134A) of an STP-enabled access switch can be determined as a root port or a designated port of that access switch, which is associated with a root bridge, a multicast router (e.g., the multicast router 110, 160) and/or destination device(s) (e.g., the receiver 117, 167) within the switched network. The multicast router can be coupled to the access switch directly or indirectly. The destination device can be any device within the switched network that can function as a destination and receive data (e.g., multicast data) from, for example, a multicast source (e.g., the multicast source 140).

In the example of FIG. 1, the multicast routers 110, 160 can be coupled to the access switch 130 indirectly. The receivers 117 and 167 can be two destination devices that are enabled to function as a destination and receive data from the multicast source 140. In some embodiments, when data transmission is between a multicast source and a destination device within an IP domain that is different from the IP domain including the multicast source, the multicast router connecting the two IP domains can be considered as the destination device in determining a multicast-router interface at the access switch associated with the multicast router. For example, for data transmissions between the multicast source 140 and destination devices within or coupled to the IP domain 165 (e.g., the receiver 167), the multicast router 160 can be considered as the destination device in determining a multicast-router interface at the access switch 130. In some embodiments, a multicast-router interface can be referred to as an M-router port.

Furthermore, in the example of FIG. 1, the STP can be run on devices in the network 100, where the multicast router 160 can be used as the root bridge for the spanning tree. At the convergence of such an STP, the port 134A of the access switch 130, the port 154A of the distribution switch 150, the link between the port 134A and the port 154A, the distribution switch 150, as well as the link between the distribution switch 150 and the multicast router 160 are included in a data path connecting the multicast source 140 and the destination device(s) included in or coupled to the IP domain 165 (e.g., the receiver 167). Thus, the port 134A can be determined as the multicast-router interface at the access switch associated with the multicast router 160. Meanwhile, the port 134A can also be a root port at the access switch 130 associated with the multicast router 160 (as the root bridge).

Similarly, at the convergence of the STP rooted at the multicast router 160, the port 132A of the access switch 130, the port 122A of the distribution switch 120, the link between the port 132A and the port 122A, the distribution switch 120, as well as the link between the distribution switch 120 and the multicast router 110 are included in a data path connecting the multicast source 140 and the destination device(s) included in or coupled to the IP domain 115 (e.g., the receiver 117). Thus, the port 132A can be determined as the multicast-router interface at the access switch 130 associated with the multicast router 110. Meanwhile, the port 132A can also be a designated port at the access switch 130 associated with the multicast router 160 (as the root bridge).

In some embodiments, a port of an access switch directly or indirectly coupled to a multicast router can be designated as an alternate port of that access switch associated with that multicast router. Such an alternate port can be included in a data path connecting the access switch with the multicast router, which, in some embodiments, can be different than the data path including the root port or designated port of the access switch associated with that multicast router.

In the example in FIG. 1, the multicast source 140 can be operatively coupled to the IP domain 165 via a data path (determined by running the STP rooted at the multicast router 160) including the link between the access switch 130 and the distribution switch 150 via the port 134A (as the root port at the access switch 130) of the access switch 130 and the port 154A of the distribution switch 150. Alternatively, the multicast source 140 can be operatively coupled to the IP domain 165 via a different data path including the link between the access switch 130 and the distribution switch 170 via the port 134B of the access switch 130 and the port 174A of the distribution switch 170. Thus, the port 134A can be designated as the multicast-router interface at the access switch 130 associated with the multicast router 160, as well as a root port at the access switch 130 with respect to the STP root bridge (i.e., the multicast router 160). On the other hand, the port 134B of the access switch 130 can be designated as an alternate port at the access switch 130 associated with the multicast router 160.

Similarly, the multicast source 140 can be operatively coupled to the IP domain 115 via a data path (determined by running the STP rooted at the multicast router 160) including the link between the access switch 130 and the distribution switch 120 via the port 132A (as the designated port at the access switch 130) of the access switch 130 and the port 122A of the distribution 120. Alternatively, the multicast source 140 can be operatively coupled to the IP domain 115 via a different data path including the link between the access switch 130 and the distribution switch 120 via the port 132B of the access switch 130 and the port 122B of the distribution switch 120. Thus, the port 132A can be designated as the multicast-router interface at the access switch 130 associated with the multicast router 110, as well as a designated port at the access switch 130 with respect to the STP root bridge (i.e., the multicast router 160). On the other hand, the port 132B of the access switch 130 can be designated as a designated port at the access switch 130 associated with the multicast router 110 and coupled to the alternate port 122B of distribution switch 120.

In some embodiments, a snooping mechanism can be implemented to control multicast data traffic at, for example, an access switch in a switched network (e.g., a LAN switched network, a VLAN switched network). Such a snooping mechanism can be, for example, IGMP snooping, MLD snooping or any other suitable snooping mechanism. In the case of IGMP/MLD snooping, the access switch is an IGMP/MLD-snooping-enabled access switch. With IGMP/MLD snooping enabled on the switched network, the access switch can be configured to monitor the IGMP/MLD transmissions between a host device (e.g., a multicast source) and a multicast router. In the monitoring process, the access switch can be configured to keep track of multicast-related messages and/or reports that are transmitted within a multicast group (e.g., a multicast source and a set of multicast receivers that are connected through the access switch). Specifically, the access switch can be configured to monitor some of the specific IGMP/MLD reports, PIM (Protocol Independent Multicast) messages and/or IGMP query messages sent by the multicast router(s). The access switch can also be configured to monitor the ports of the access switch that are member ports associated with the multicast groups and ports on which PIM messages, IGMP query messages, and/or specific IGMP/MLD reports are received. As a result, the access switch can be configured to use the recorded information to make intelligent decisions on which interface (or equivalently, port) of the access switch to forward the multicast data towards a destined multicast router or multicast receiver. The access switch can then be configured to forward the multicast data traffic towards the destined multicast router or multicast receiver via the intended interface of the access switch accordingly. In some embodiments, such an intended interface, on which a PIM message, a IGMP query message and/or a specific IGMP/MLD report sent by a multicast router is received, can be defined as a multicast-router interface associated with the multicast router.

In some embodiments, a port of an IGMP/MLD-snooping-enabled access switch can be made a multicast-router interface associated with a given multicast router if an IGMP report associated with a specific multicast address (an IPv4 address, e.g., 224.0.0.4, 224.0.0.13, 224.0.0.22, etc.), a MLD report associated with a specific multicast address (an IPv6 address, e.g., FF02:0:0:0:0:0:0:4, FF02:0:0:0:0:0:0:D, FF02:0:0:0:0:0:0:16, etc.), and/or a PIM or IGMP query message sent from that multicast router is received at that port. In other embodiments, alternatively, other suitable mechanisms can be used to determine a multicast-router interface, which is associated with a given multicast router, at an IGMP/MLD-snooping-enabled access switch. Regardless of the mechanism used to determine a multicast-router interface, the multicast-router interface at an access switch is a port of that access switch that is connected directly or indirectly to the associated multicast router. Furthermore, as a result of a multicast-router interface associated with a multicast router being determined at an access switch, multicast data sent by a multicast source (e.g., a host, a server, etc.) and destined to multicast receivers associated with the multicast router can be forwarded at the access switch over that multicast-router interface. Additionally, as described herein, in response to receiving the multicast data, which is originated at the multicast source attached directly to a LAN/VLAN and switched at the access switch, the multicast router can route the received multicast data to multicast receivers present in a different IP subnet outside the LAN/VLAN.

In the example of FIG. 1, the access switch 130 can be enabled with IGMP-snooping or MLD-snooping capability. Thus, IGMP snooping or MLD snooping can be implemented at the access switch 130 such that the multicast data traffic going through the access switch 130 (e.g., from the multicast source 140 to the receivers 117, 167) can be controlled appropriately at the access switch 130. Specifically, with IGMP snooping or MLD snooping enabled on the network 100, the access switch 130 can be configured to monitor the IGMP/MLD and PIM transmissions, and to allow multicast data transmissions, between the multicast source 140 and the multicast routers 110, 160 and the multicast receivers in the same VLAN and/or in a different subnet. In the monitoring process, the access switch 130 can be configured to monitor the multicast-router interfaces at the access switch 130, as well as the ports of the access switch 130 that are member ports associated with the multicast groups including the multicast receivers. As a result, the access switch 130 can be configured to determine that multicast data sent by the multicast source 140 and towards the multicast router 110 should be forwarded via the port 132A, and multicast data sent by the multicast source 140 and towards the multicast router 160 should be forwarded via the port 134A. That is, the port 132A is made the multicast-router interface associated with the multicast router 110, and the port 134A is made the multicast-router interface associated with the multicast router 160. Thus, the access switch 130 can be configured to forward the multicast data traffic to the multicast routers 110 and 160 via the ports 132A and 134A, respectively.

In some embodiments, the ports 132A and 134A of the access switch 130 can be made the multicast-router interfaces associated with the multicast routers 110 and 160, respectively, in response to PIM messages and/or IGMP messages sent from the corresponding multicast routers being received at those ports. As a result of the port 132A and 134A being made the multicast-router interfaces associated with the multicast routers 110 and 160, multicast data sent by the multicast source 140 and towards the multicast router 110 and 160 can be forwarded at the access switch 130 over the port 132A to the port 122A of the distribution switch 120, and over the port 134A to the port 154A of the distribution switch 150, respectively. Additionally, in response to receiving the multicast data originated at the multicast source 140 and switched at the access switch 130, the multicast router 110 or 160 can route the received multicast data to the receiver 117 or 167 present in (or coupled to) the IP domain 115 or 165, respectively, which can be a different IP subnet outside the IP subnet that includes the multicast source 140.

In some embodiments, for an access switch that is STP-enabled and IGMP/MLD-snooping-enabled, a root port or designated port of a spanning tree protocol (e.g., STP, RSTP, VSTP, MSTP, etc.) and a multicast-router interface associated with a given multicast router can be the same port of the access switch. In the example of FIG. 1, the port 132A of the access switch 130 can be both a designated port of a VLAN and the multicast-router interface associated with the multicast router 110. In this case, the multicast data originated at the multicast source 140 and destined to the receiver 117 can be sent from the access switch 130 to the multicast router 110. As a result of the port 132A being made the multicast-router interface associated with the multicast router 110, the multicast data is forwarded from the access switch 130 towards the multicast router 110 via the port 132A (to the port 122A of the distribution switch 120). Consequently, the multicast data is forwarded at the access switch 130 via the designated port in the VLAN, where the multicast router 160 is the root bridge of the VLAN.

Similarly, the port 134A of the access switch 130 can be both a root port of the VLAN and the multicast-router interface associated with the multicast router 160. In this case, the multicast data originated at the multicast source 140 and destined to the receiver 167 can be sent from the access switch 130 to the multicast router 160. As a result of the port 134A being made the multicast-router interface associated with the multicast router 160, the multicast data is forwarded from the access switch 130 towards the multicast router 160 via the port 134A (to the port 154A of the distribution switch 150). Consequently, the multicast data is forwarded at the access switch 130 via the root port in the VLAN, where the multicast router 160 is the root bridge of the VLAN.

In some embodiments, a topology of a switched network can be changed due to various reasons such as, for example, an error occurs at a root port or a designated port at an access switch; a new data path between an access switch and a destination device becomes active; a new port at an access switch is activated that has a better cost to a destination device; a link between two devices is down; and/or the like. In such embodiments, a spanning tree protocol can be re-run in the switched network and new root ports and/or designated ports can be determined after convergence of the STP. In some embodiments, as a result of the topology change, the STP may converge differently such that a port that operated as a multicast-router interface may be dedesignated as the multicast-router interface. In such embodiments, the multicast-router interface can be re-determined.

For example, the designated port at the access switch 130 with respect to the root bridge of the VLAN (i.e., the multicast router 160), which also operates as the multicast-router interface associated with the multicast router 110, can be changed from the port 132A to the port 132B (which can be a designated port at the access switch 130 but not a multicast-router interface associated with the multicast router 110) as a result of an error associated with the port 132A. For another example, after a new data path connecting the port 134B and the distribution switch 170 becomes active, the port 134B has a better cost (e.g., shorter transmission time, higher throughput, etc.) to the multicast router 160 than the port 134A. As a result, the multicast-router interface at the access switch 130 associated with the multicast router 160 can be re-determined.

In some embodiments, in response to an STP convergence, an indication of a topology change can be available at the access switch that is both STP-enabled and IGMP/MLD-snooping-enabled. Such an indication of the topology change can be in the form of, for example, STP TCN or any other suitable type of message. In some embodiments, the access switch can be configured to generate the indication of the topology change based on the portion of the STP convergence operated at that access switch. In such embodiments, the access switch can be configured to distribute the indication of the topology change to other devices in the switched network. In other embodiments, the access switch can be configured to receive the indication of the topology change from another device of the switched network based on where the topology change occurs (e.g., where an active link has gone down or come up).

For example, the access switch 130 can be configured to generate an STP TCN, indicating that the designated port at the access switch 130 with respect to the multicast router 160 (as the root bridge) is changed from the port 132A to the port 132B. For another example, the access switch 130 can be configured to receive an STP TCN from the distribution switch 170, indicating that a link connecting the port 134B of the access switch 130 with the port 174A of the distribution switch 170 is activated.

As a result of the topology change, an existing data path from the access switch to the multicast router might be changed from operable to inoperable, and/or a new data path from the access switch to the multicast router might be changed from inoperable to operable. Accordingly, the existing multicast-router interface at the access switch associated with the multicast router may not stay the same after the topology change. Thus, a new multicast-router interface can be determined at the access switch. For example, as a result of a topology change in an aggregated Ethernet, a new link connecting an access switch and a multicast router is added, which increases the aggregated Ethernet's bandwidth. Such a new link can potentially be a better path from the access switch to the multicast router. Accordingly, a port at the access switch associated with the new link can potentially be the new multicast-router interface at the access switch associated with the multicast router.

In some embodiments, in response to the indication of the topology change that is generated or received at the access switch, followed by local topology convergence at the access switch, the access switch can be configured to determine a new multicast-router interface for a multicast router operatively coupled to the access switch. Specifically, the access switch can be configured to send a message to the multicast router via each port from a set of ports of the access switch. This message can be in any type that requests the multicast router to return a response to the access switch in response to receiving this message. In some embodiments, this message can be any type of message used to proactively probe an IGMP/MLD-enabled VLAN for multicast routers. In some embodiments, the message can be sent and/or flooded multiple times (e.g., 2-3 times) such that the message reaches every device in the topology at least once based on a complete topology convergence.

In some embodiments, the message can be a group-specific query to determine the reception state at the multicast router for a particular multicast address. Such a message can be, for example, an IGMP group-specific query, a MLD query (e.g., a MLDv2 (version 2) group-specific query), etc. For example, the message can be an IGMP group-specific query with a source IP address (IPv4 address) 0.0.0.0 and a destination IP address (IPv4 address) 224.0.0.4, 224.0.0.13 or 224.0.0.22. For another example, the message can be a MLDv2 group-specific query with a source IP address (IPv6 address) 00:00:00:00:00:00:00:00 and a destination IP address (IPv6 address) FF02:0:0:0:0:0:0:4, FF02:0:0:0:0:0:0:D or FF02:0:0:0:0:0:0:16.

In some embodiments, the access switch can be configured to send the message to the multicast router via each port at the access switch that was previously marked as being operatively coupled to the multicast router. In some embodiments, the access switch can be configured to send the message to the multicast router via each port of the access switch that is in an STP FWD state to the multicast router, while excluding any STP edge port that is in a designated/FWD mode (that is, any edge designated forwarding port). In such embodiments, the state (or mode) of a port can be determined or updated in the STP convergence. In some embodiments, for example, an IGMP/MLD-snooping module of the access switch can be configured to flood an IGMP/MLD V2 group-specific query on all STP FWD ports (excluding STP edge ports in a designated/FWD mode) of that access switch to probe proactively for any multicast-router.

For example, in response to generating the STP TCN that indicates a change in the designated port at the access switch 130 with respect to the multicast router 160 (as the root bridge), the access switch 130 is configured to flood an IGMP query (e.g., in this example, send two IGMP queries, which can be sent substantially simultaneously), with a source IP address 0.0.0.0 and a destination IP address 224.0.0.4, to query for the multicast routers (e.g., multicast router 110 and/multicast router 160) via the port 132B and the port 134A, respectively, which are both in an STP FWD state after the port 132A is changed to an STP BLOCK state. For another example, in response to receiving the STP TCN that indicates a topology change associated with the distribution switch 170, the access switch 130 is configured to flood an MLD query (e.g., in this example, send three MLD queries, which can be sent substantially simultaneously), with a source IP address 00:00:00:00:00:00:00:00 and a destination IP address FF02:0:0:0:0:0:0:4, to query for the multicast routers (e.g., multicast router 160 and/multicast router 110) via the port 134B, the port 132A and the port 132B, respectively, which are in an STP FWD state after the port 134A is in an STP BLOCK state due to 132B changing to an STP FWD state.

After receiving such a message from a port of the access switch, the multicast router can be configured to return a response to that port of the access switch, which can be used to verify the data path from that port of the access switch to the multicast router (or equivalently, the multicast router is reachable from that port of the access switch). The response returned from the multicast router can be, for example, an IGMP/MLD report in response to the IGMP/MLD query received at the multicast router. Furthermore, the response is sent from the multicast router to the port of the access switch from which the message (e.g., IGMP/MLD query) was previously sent. Thus, the access switch can be configured to determine, based on the response, which port is effectively coupled to and can be used to send multicast data to the multicast router.

In response to receiving a response returned from the multicast router at a port of the access switch, the access switch can be configured to designate that port as the new multicast-router interface associated with that multicast router or refresh a timeout timer if received on a port that is already a multicast-router interface. Furthermore, if the port previously designated as the multicast-router interface does not receive a response (until the most recent STP convergence), the access switch can be configured to dedesignate the port, which had been designated as the (previous) multicast-router interface, as the multicast-router interface. Thus, no more than one port of the access switch would function as the multicast-router interface associated with the given multicast router at the same time.

In some embodiments, if the access switch receives a returned response from the multicast router at a set of more than one port, the access switch can be configured to select one from the set of ports, and designate the selected port as the new multicast-router interface associated with the multicast router. In some embodiments, the access switch can be configured to select a port from the set of ports based on, for example, a timely order of receiving returned responses, a predetermined priority ranking, or any other suitable criteria. For example, the access switch can be configured to select a port that is the last port (i.e., the latest port) to receive a returned response from the multicast router. For another example, the access switch can be configured to select a port that has the highest rank in a predetermined priority ranking among the set of ports.

In some embodiments, after a port of the access switch is designated as the new multicast-router interface associated with the multicast router, the port can be maintained as such a multicast-router interface for a period of time. For example, such a period of time can be configured or selected by, for example, an administrator of the switched network. In some embodiments, the port can be maintained as the multicast-router interface until that port is dedesignated as the multicast-router interface (e.g., due to a topology change). In all scenarios, as long as the port of the access switch is maintained as the multicast-router interface associated with the multicast router, multicast data traffic sent from the access switch to the multicast router can be sent over that port of the access switch.

In some embodiments, if no response to the message is received at any port of the access switch, the access switch can assume that no data path connecting the access switch with the multicast router is operable. In other words, the multicast router is no more reachable from the access switch. In such a scenario, in some embodiments, the access switch can be configured to maintain the port that has been previously designated as the multicast-router interface as the current multicast-router interface. In some other embodiments, the access switch can be configured to dedesignate the port that has been previously designated as the multicast-router interface as the multicast-router interface, while designating no other port as the multicast-router interface. That is, the role of multicast-router interface associated with the multicast router is unfilled, until a port is designated as the new multicast-router interface in the future.

In some embodiments, techniques other than the IGMP/MLD queries and responses can also be used to verify the data path from a port of an access switch to a multicast router. In some embodiments, if a protocol-related message is received from the multicast router at the port of the access switch, the access switch can determine that the multicast router is reachable from that port of the access switch. Such a protocol-related message can be, for example, an IGMP/MLD V2 (version 2) report, a PIM-SM (space mode)/DM (dense mode) packet, a DVMRP (distance vector multicast routing protocol) packet, or the like.

For example, the access switch 130 receives a signal from the multicast router 110 at the port 132B, which includes a response to the IGMP query (e.g., with a source IP address 0.0.0.0 and a destination IP address 224.0.0.4) previously sent from the port 132B. In response to the signal, the access switch 130 is configured to designate the port 132B as the multicast-router interface associated with the multicast router 110, meanwhile dedesignate the port 132A as the multicast-router interface associated with the multicast router 110. As a result, multicast data traffic sent from the access switch 130 to the multicast router 110 is sent over the port 132B towards the multicast router 110 (i.e., to the port 122B of the distribution switch 120). Thus, by designating the port 132B as the multicast-router interface based on receiving the signal, the loss of multicast data can be reduced. Specifically, the access switch 130 can designate the port 132B as the multicast-router interface prior to receiving an indication from a current snooping mechanism that the port 132B is to be designated as the multicast-router interface, thus reducing the loss of multicast data.

For another example, at a first time the access switch 130 receives a signal from the multicast router 160 at the port 134B, which includes a response to the MLD query (e.g., with a source IP address 00:00:00:00:00:00:00:00 and a destination IP address FF02:0:0:0:0:0:0:4) previously sent from the port 134B. At a second time after the first time, the access switch 130 receives a signal from the multicast router 160 at the port 134A, which includes a response to the MLD query (e.g., with a source IP address 00:00:00:00:00:00:00:00 and a destination IP address FF02:0:0:0:0:0:0:4) previously sent from the port 134A. Based on a timely order of the two received signals, the access switch 130 is configured to designate the port 134A as the multicast-router interface associated with the multicast router 160, and dedesignate the port 134B as the multicast-router interface associated with the multicast router 160. As a result, multicast data traffic sent from the access switch 130 to the multicast router 160 is sent over the port 134A towards the multicast router 160 (i.e., to the port 154A of the distribution switch 170).

Figure 2:
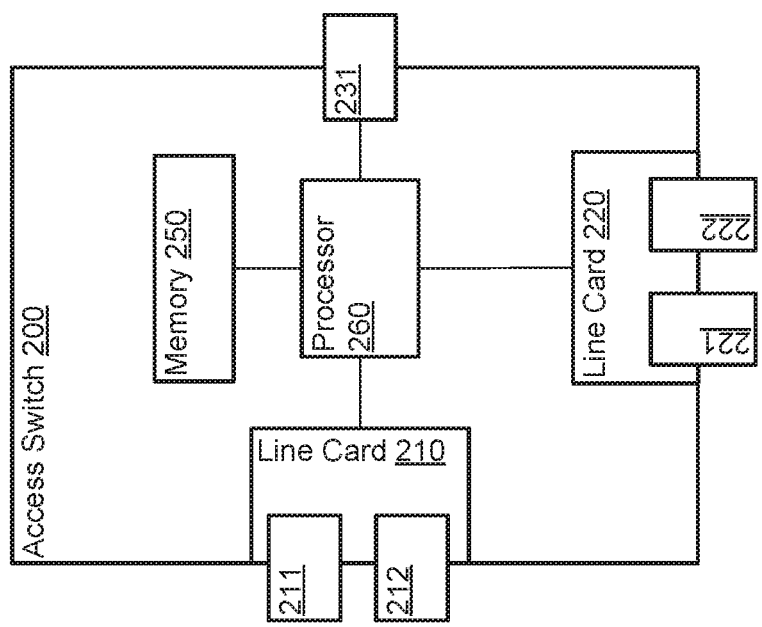
FIG. 2 is a system block diagram of an access switch, according to an embodiment.

FIG. 2 is a system block diagram of an access switch 200, according to an embodiment. The access switch 200 can be structurally and functionally similar to the access switch 130 shown and described with respect to FIG. 1. As shown in FIG. 2, the access switch 200 includes a processor 260, a memory 250, line cards 210, 220, and a port 231. The processor 260 is operatively coupled to the memory 250, line card 210, line card 220 and port 231. The line card 210 includes ports 211 and 212. The line card 220 includes ports 221 and 222. In some embodiments, line cards 210 and/or 220 can include one or more processors and/or memories. In some embodiments, a port (e.g., port 211, 212, 221, 222, 231) can be any entity that can actively communicate with a coupled device or over a network. The port need not necessarily be a hardware port, but can be a virtual port or a port defined by software (stored in and/or executed by hardware).

In some embodiments, an access switch (e.g., the access switch 130 in FIG. 1, the access switch 200 in FIG. 2) can be structurally similar to a distribution switch (e.g., the distribution switch 120, 150, 170 in FIG. 1). In such embodiments, each access switch or distribution switch can be a switching device configured to redirect data (e.g., data packets, data cells, etc.) as it flows through that access switch or distribution switch. Such a switching device can be, for example, a packet switch, a frame switch, an integrated Ethernet switch, a cell switch and/or the like. In some embodiments, for example, each access switch or distribution switch can include multiple ingress ports (e.g., the ports 211, 212) operatively coupled to write interfaces on a memory buffer (e.g., included in the memory 250), as well as multiple egress ports (e.g., the ports 221, 222) operatively coupled to read interfaces on the memory buffer (e.g., included in the memory 250). In some embodiments, the memory buffer can be a shared memory buffer implemented using on-chip static random access memory (SRAM) to provide sufficient bandwidth for all ingress ports to write one incoming data cell (e.g., a portion of a data packet) or data packet per time period (e.g., one or more clock cycles) and for all egress ports to read one outgoing data cell or data packet per time period. Additionally, in some embodiments, each access switch or distribution switch can operate similarly to a crossbar switch that can be reconfigured in subsequent each time period.

In some embodiments, the ports 211, 212, 221, 222 and 231 can be part of one or more communication interfaces and/or network interfaces (e.g., a 40 Gigabit (Gb) Ethernet interface, a 100 Gb Ethernet interface), through which the access switch 200 can send data (e.g., data flows of data cells) to and/or receive data from other devices (e.g., a multicast source, a distribution switch, a multicast router) in a switched network. The devices that communicate with the access switch 200 can be directly or operatively coupled to one or more ports of the access switch 200 using any suitable connection such as, for example, an optical connection (e.g., an optical cable and optical connectors), an electrical connection (e.g., an electrical cable and electrical connectors), a wireless connection (e.g., a wireless link and wireless signal transceivers) and/or the like. Similarly stated, in some embodiments, the ports 211, 212, 221, 222 and 231 can implement a physical layer using twisted-pair electrical signaling via electrical cables, or fiber-optic signaling via fiber-optic cables, or wireless signaling via a wireless link between two wireless signal transceivers. In some embodiments, some of the ports 211, 212, 221, 222 and 231 implement one physical layer such as twisted-pair electrical signaling and others of the ports 211, 212, 221, 222 and 231 implement a different physical layer such as fiber-optic signaling.

Furthermore, the ports 211, 212, 221, 222 and 231 can allow the access switch 200 to communicate with other devices that are coupled to the access switch via one or more communication protocols (e.g., an Ethernet protocol, a MPLS protocol, a Fibre Channel protocol, a wireless communication protocol, an Infiniband-related protocol, etc.). In some embodiments, some of the ports 211, 212, 221, 222 and 231 implement one protocol such as Ethernet and others of the ports 211, 212, 221, 222 and 231 implement a different protocol such as Fibre Channel. Thus, the access switch 200 can be in communication with multiple devices using homogeneous or heterogeneous physical layers and/or protocols via one or more ports 211, 212, 221, 222 and/or 231.

For example, the ports 211 and 212 can be coupled to a distribution switch (e.g., the distribution switch 120, 150 or 170 in FIG. 1) using electrical connections; the ports 221 and 222 can be coupled to a multicast router (e.g., the multicast router 110 or 160 in FIG. 1) using optical connections; and the port 231 can be coupled to a multicast source (e.g., the multicast source 140 in FIG. 1) using a wireless connection. In this case, each port 211, 212, 221, 222 or 231 is enabled of transmitting data (e.g., multicast data packets) with other devices using the appropriate communication protocol (e.g., an Ethernet protocol, a Fibre Channel protocol, a wireless communication protocol) over the corresponding port.

In some embodiments, the memory 250 can be, for example, a random-access memory (RAM) (e.g., a dynamic RAM, a static RAM), a flash memory, a removable memory, and/or so forth. In some embodiments, instructions related to switching and/or transmitting data through the ports 211, 212, 221, 222 and/or 231 can be stored within and maintained at the memory 250, and executed at the processor 260. In such embodiments, the memory 250 can include, for example, a process, application, virtual machine, and/or some other software module (executing in hardware) or a hardware module configured to manage the ports 211, 212, 221, 222 and 231. For example, configuration information (e.g., port protocol information, port designation information, etc.) and/or forwarding-state information (e.g., port identifiers, a forwarding table, etc.) associated with one or more multicast groups (e.g., a multicast source and a set of multicast receivers) and their associated member ports can be stored and/or maintained within the memory 250. For another example, a state and/or status of each device associated with the multicast group(s), status of each port associated with the multicast group(s), and/or any other related information can be monitored and maintained within the memory 250.

In some embodiments, the access switch 200 can be used to couple a device (e.g., a multicast source) to the remaining portion of the network that hosts the access switch 200 and the device. For example, a multicast source (e.g., the multicast source 140 in FIG. 1) can be connected to the port 231 of the access switch 200. Thus, the access switch 200 can receive multicast data from the multicast source from the port 231, and then send the multicast data to the appropriate receivers via, for example, the ports 211, 212, 221 and/or 222. In some embodiments, the access switch 200 can designate a port of the access switch 200 as a root port or a designated port with respect to a root bridge by executing, for example, the STP. In some embodiments, the access switch 200 can designate a port of the access switch 200 as a multicast-router interface associated with the multicast source and a multicast router by executing, for example, IGMP snooping or MLD snooping. Furthermore, in some embodiments, the access switch 200 can be configured to change, modify, update and/or dedesignate the root port, the designated port or the multicast-router interface, as described in detail with respect to FIGS. 1, 3 and 4.

Figure 3:
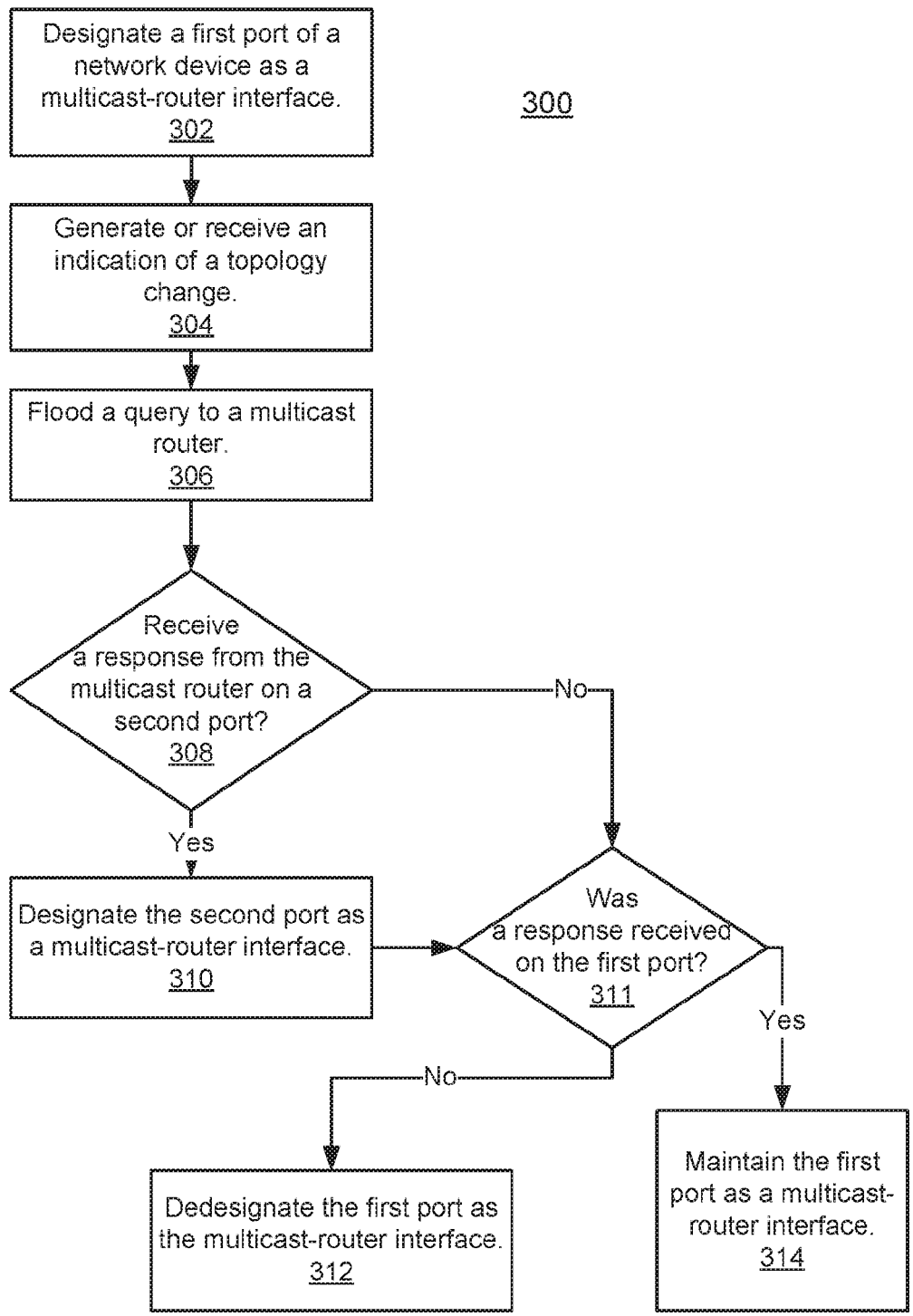
FIG. 3 is a flowchart illustrating a method for determining a multicast-router interface at a network device, according to an embodiment.

FIG. 3 is a flowchart illustrating a method 300 for determining a multicast-router interface during topology changes at a network device, according to an embodiment. The network device performing the method 300 can be any type of switching device such as, for example, an access switch or a distribution switch. The network device can be coupled (directly or operatively) to a multicast source that can originate multicast data traffic, and a multicast router that is coupled to an IP domain. The network device, the multicast source and the multicast router can be included in a switched network. In some embodiments, the network device can be configured to switch multicast data received from the multicast source. If the intended receivers of the multicast data include one or more devices included in the IP domain coupled to the multicast router, the network device can be configured to transmit the multicast data (or a copy of the multicast data) to the multicast router, which can then route the multicast data towards the receivers within the IP domain.

In some embodiments, a memory (e.g., the memory 250 in FIG. 2) within the network device having a set of ports (e.g., the ports 211, 212, 221, 222 and 231 of the access switch 200 in FIG. 2) contains a non-transitory processor-readable medium that stores code representing instructions to be executed by a processor (e.g., the processor 260 of the access switch 200 in FIG. 2) of the network device. These instructions can cause the processor to execute a series of operations with respect to determining a multicast-router interface at a network device in case of a topology case, as described below.

In some embodiments, a loop-free topology can be discovered and/or ensured for the switched network by executing a network protocol in the switched network, such as the STP, the RSTP, the VSTP, the MSTP, or the like. For example, a spanning tree topology can be discovered for the switched network at the convergence of the network protocol, where the spanning tree is rooted at a switch in the L2 domain (e.g., as a root bridge). As a result, a data path that connects the multicast source and devices in the IP domain (or equivalently, the multicast router) and goes through the network device can be determined.

At 302, a first port of a network device can be designated as a multicast-router interface associated with the multicast router, where the first port is from the set of ports of the network device. Specifically, by operating a snooping mechanism such as IGMP/MLD snooping, the network device can determine to which port of the network device data (e.g., multicast data) intended to the multicast router should be sent, as described above with respect to FIG. 1. If the data is determined to be sent towards the multicast router via the first port of the network device based on receiving, for example, a PIM message from the multicast router at the first port, the first port can be designated as the multicast-router interface associated with the multicast router. As a result, the network device can be configured to forward any multicast data intended to the multicast router over the first port of the network device.

In the example of FIG. 1, a spanning tree topology that is rooted at the multicast router 160 can be discovered and/or ensured for the network 100 by executing the STP in the network 100. As a result, a data path connecting the multicast source 140 and the IP domain 165 (i.e., through the multicast router 160) can be determined, which includes the port 134A of the access switch 130, the port 154A of the distribution switch 120, and the link connecting these two ports. Thus, the port 134A of the access switch 130 is designated as the multicast-router interface associated with the multicast router 160.

Similarly, the port 132A of the access switch 130 can be designated as the multicast-router interface associated with the multicast router 110. Such a designation can be made by operating IGMP/MLD snooping at the access switch 130. As a result, the access switch 130 can be configured to forward multicast data, including the multicast data originated at the multicast source 140 and intended to the receiver 117 or any other device in the IP domain 115, to the distribution switch 120 via the port 132A of the access switch 130.

At 304, an indication of a topology change can be generated or received at the network device. Such an indication can be, for example, an STP TCN. In some embodiments, the topology change can be associated directly with the first port (as the multicast-router interface) of the network device. In some other embodiments, the topology change can be associated with any port, device, and/or link included in the data path that connects the first port (as the multicast-router interface) of the network device to the multicast router. In either case, the indication of the topology change triggered by, for example, the STP TCN can indicate to the network device that the first port of the network device may no longer be capable of functioning as the multicast-router interface associated with the multicast router. In some embodiments, such an indication of topology change can be caused by, for example, a malfunction at the first port of the network device, a broken link in the data path, a failure at a device directly or operatively coupled to the first port of the network device, any other type of error in the switched network, or a combination of the above-mentioned scenarios.

In the example of FIG. 1, an indication of a topology change (e.g., an STP TCN) in the network 100 can be generated or received at the access switch 130. The topology change can be associated with the port 134A of the access switch, or any other device, port, and/or link in the data path connecting the access switch 130 and the multicast router 160. For example, the indication of the topology change can be caused by a failure at the port 134A, the port 154A or the port 154B. The indication of the topology change can indicate to the access switch 130 that the port 134A of the access switch 130 may no longer be capable of functioning as the multicast-router interface associated with the multicast router 160.

Similarly, in the example of FIG. 1, another indication of a topology change (e.g., another STP TCN) can be generated or received at the access switch 130. The topology change can be associated with the port 132A of the access switch, or any other device, port, and/or link in the data path connecting the access switch 130 and the multicast router 110. For example, the indication of the topology change can be caused by a failure at the port 132A, the port 122A or a broken link connecting these two ports. The indication of the topology change can indicate to the access switch 130 that the port 132A of the access switch 130 may no longer be capable of functioning as the multicast-router interface associated with the multicast router 110.

At 306, a query can be flooded to one or more of the multicast routers from the network device. For example, the query can be sent from the network device to the multicast router via each port from a set of ports of the network device that are in an STP FWD state, excluding STP edge ports in a designated/FWD mode after the local topology converges in response to receiving the topology change indication. The query can be used in verifying the reachability of the network device to the multicast router. In some embodiments, the query can be any type of query that requests the multicast router to return a response to the network device in response to receiving the query. In some embodiments, such a query can be, for example, an IGMP/MLD V2 group-specific query. In some embodiments, the message can be sent and/or flooded multiple times (e.g., 2-3 times) such that the message reaches every device in the topology at least once based on a complete topology convergence.

In the example of FIG. 1, in response to the indication of the topology change, the access switch 130 can be configured to flood an IGMP/MLD V2 group-specific query to the multicast router 160, the multicast router 110 and/or any other multicast router via all the ports that are in an STP FWD state including, for example, the ports 132A, 132B, and 134A. The IGMP/MLD V2 group-specific query sent from the access switch 130 can be used in verifying the reachability from the access switch 130 to the multicast router 160, the multicast router 110 and/or any other multicast router.

At 308, the network device can determine whether a response to the query is received from the multicast router on a second port from the set of ports at the network device, where the second port can be any port different than the first port from the set of ports. Such a response can be, for example, an IGMP/MLD report for the IGMP/MLD V2 group-specific query previously sent from the network device.

If a response to the query is received from the multicast router on a second port different than the first port at the network device, the network device can be configured to designate the second port as the multicast-router interface associated with the multicast router, at 310. As a result, multicast data sent by the multicast source to the multicast router can be forwarded on the second port at the network device. Thus, by designating the second port as the multicast-router interface based on receiving the response, the loss of multicast data can be reduced. Specifically, the network device can designate the second port as the multicast-router interface prior to receiving an indication from a current snooping mechanism that the second port is to be designated as the multicast-router interface, thus reducing the loss of multicast data.

The network device can then determine if a response was received on the first port, at 311, irrespective of whether a response was received on the second port. If a response was received on the first port, the network device can maintain the first port as a multicast-router interface, at 314. In some embodiments, this can be in addition to the network device designating the second port as a multicast router interface. Thus, in such embodiments, the network device can include multiple multicast router interfaces, in some embodiments, for example, corresponding to a single and/or multiple multicast routers.

Furthermore, if a response was not received on the first port, the network device can be configured to dedesignate the first port as the multicast-router interface associated with the multicast router, at 312. Thus, in such a situation, the network device does not send multicast data to the multicast router via the first port.

If no response to the query is received from the multicast router on any port (i.e., the network device does not receive a response on either the first port or the second port), the network device can be configured to maintain no port as the multicast-router interface associated with the multicast router, at 312. As a result, multicast data is not transmitted to the multicast router that was previously associated with the first port.

In some embodiments, a timeout timer can be used. In such embodiments, the timeout timer associated with a port can be initiated and/or refreshed to a predetermined amount of time when the network node receives a response from the multicast router on that port. In some embodiments, the timeout timer can be associated with a snooping mechanism used by the network node. In some embodiments, for example, if a response is received on a first port, then the first port can be maintained as a multicast-router interface and the timeout timer refreshed to the predetermined amount of time. If, however, a response is not received on the first port, the first port can be dedesignated as a multicast router interface.

In some embodiments, when the domain includes multiple multicast routers, if responses to the query are received from the multicast routers on multiple ports at the network device (e.g., on both the first port and a second port different than the first port at the network device), the network device can be configured to refresh a timeout timer on the port that is already a multicast-router interface associated with a multicast router, or designate a new port as the multicast-router interface if the port is already not a multicast-router interface associated with a multicast router. Also, the network device can be configured to dedesignate the port from being a multicast-router interface already designated as a multicast-router interface if no response is received from a multicast router on that port. In other embodiments, the network device can be configured to select a port from the first port and the second port (as described above), and designate the selected port as the multicast-router interface associated with the multicast router.

In the example of FIG. 1, the access switch 130 can determine whether a response to the IGMP/MLD V2 group-specific query is received from the multicast router 160 at any port other than the port 134A, which is the current multicast-router interface associated with the multicast router 160. If such a response is received at, for example, the port 134B, the access switch 130 can be configured to designate the port 134B as the multicast-router interface associated with the multicast router 160. The access switch 130 can then determine whether a response to the IGMP/MLD V2 group-specific query is received from the multicast router 160 at the port 134A. If no response is received at the port 134A, the access switch 130 can dedesignate the port 134A as the multicast-router interface associated with the multicast router 160. In some embodiments, if no response is received from the multicast router 160 at any port, the access switch 130 can be configured to maintain no port as the multicast-router interface associated with the multicast router 160. Additionally, in some embodiments, if responses are received at both the port 134A and the port 134B from the multicast router 160, the access switch 130 can be configured to select one from the two ports and designate (or maintain) the selected port as the multicast-router interface associated with the multicast router 160. In some embodiments, the last port to receive the response can be designated (or maintained) as the multicast-router interface associated with the multicast router 160.

Similarly, the access switch 130 can determine whether a response to the IGMP/MLD V2 group-specific query is received from the multicast router 110 at any port other than the port 132A, which is the current multicast-router interface associated with the multicast router 110. If such a response is received at, for example, the port 132B, the access switch 130 can be configured to designate the port 132B as the multicast-router interface associated with the multicast router 110. The access switch 130 can then determine whether a response to the IGMP/MLD V2 group-specific query is received from the multicast router 110 at the port 132A. If no response is received at the port 132A, the access switch 130 can dedesignate the port 132A as the multicast-router interface associated with the multicast router 110. In some embodiments, if no response is received from the multicast router 110 at any port other than the port 132A, the access switch 130 can be configured to maintain no port as the multicast-router interface associated with the multicast router 110. Additionally, in some embodiments, if responses are received at both the port 132A and the port 132B from the multicast router 110, the access switch 130 can be configured to select one from the two ports and designate (or maintain) the selected port as the multicast-router interface associated with the multicast router 110. In some embodiments, the last port to receive the response can be designated (or maintained) as the multicast-router interface associated with the multicast router 110.

Figure 4:
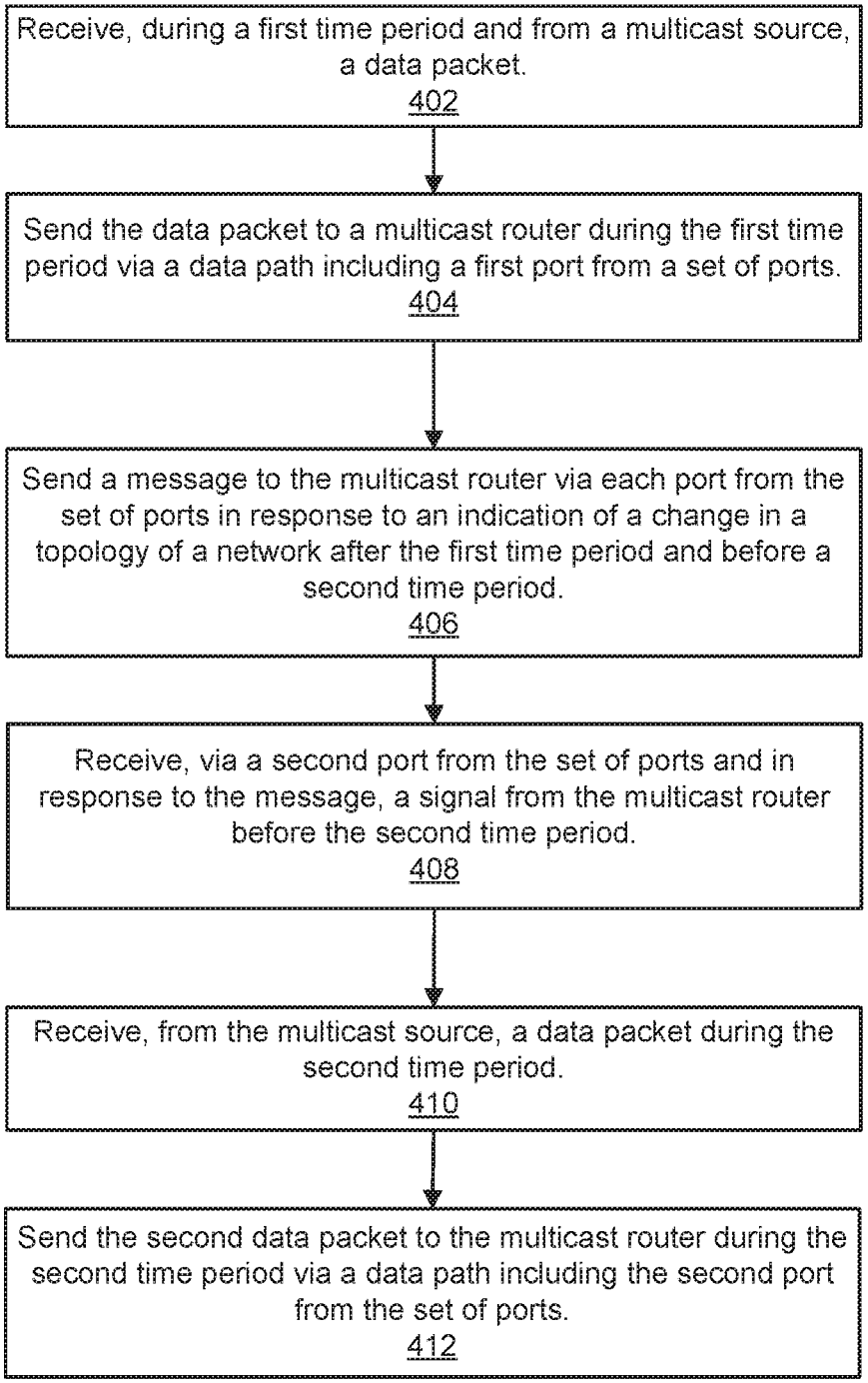
FIG. 4 is a flowchart illustrating a method for changing data path for forwarding multicast data in response to a topology change in a network, according to an embodiment.

FIG. 4 is a flowchart illustrating a method 400 for changing the data path for forwarding multicast data in response to a topology change in a network, according to an embodiment. The method 400 can be performed at, for example, an access switch similar to the access switch 130 or the access switch 200 shown and described with respect to FIGS. 1-2. Such an access switch can be coupled (directly or operatively) to a multicast source that can originate multicast data traffic, and a multicast router that is coupled to an IP domain. The access switch, the multicast source and the multicast router can be included in a network similar to the network 100 in FIG. 1.

At 402, the access switch can be configured to receive a data packet from the multicast source during a first time period. The data packet can be included in multicast data destined to devices in the IP domain. Thus, the data packet can be sent to the multicast router such that the data packet can be forwarded by the multicast router to devices in the IP domain.

At 404, the access switch can be configured to send the data packet to the multicast router during the first time period via a data path including a first port from a set of ports of the access switch. Such a data path connects the first port of the access switch with the multicast router (directly or indirectly). The first port is designated as the multicast-router interface associated with the multicast router at the access switch.

At 406, the access switch can be configured to send a message to the multicast router via each port from the set of ports in response to an indication of a change in a topology of the network after the first time period and before a second time period followed by local topology convergence. Such an indication of the topology change can be, for example, an STP TCN. In some embodiments, the access switch can be configured to generate the indication of the topology change if the topology change occurs at, for example, a port or a link associated with the access switch. In such embodiments, the access switch can be configured to distribute the indication of the topology change to other devices in the network. In other embodiments, the access switch can be configured to receive the indication of the topology change from another device that is associated with the topology change. Furthermore, in response to generating or receiving the indication of the topology change, the access switch can be configured to flood a message to the multicast router via each port from the set of ports. In some embodiments, the message can be sent and/or flooded multiple times (e.g., 2-3 times) such that the message reaches every device in the topology at least once based on a complete topology convergence. Such a message can be, for example, an IGMP query or a MLD query. In some embodiments, each port from the set of ports is in an STP FWD state and is not an STP edge port in a designated/FWD mode.

At 408, the access switch can be configured to receive, via a second port from the set of ports and in response to the message, a signal from the multicast router before the second time period. The second port is different than the first port from the set of ports. The signal can be, for example, an IGMP/MLD report in response to the IGMP/MLD query previously sent from the second port to the multicast router. As a result of receiving the signal via the second port, the access switch can be configured to designate the second port as the multicast-router interface associated with the multicast router and dedesigante the first port as the multicast-router interface associated with the multicast router. Thus, by designating the second port as the multicast-router interface based on receiving the response, the loss of multicast data can be reduced. Specifically, the network device can designate the second port as the multicast-router interface prior to receiving an indication from a current snooping mechanism that the second port is to be designated as the multicast-router interface, thus reducing the loss of multicast data.

At 410, the access switch can be configured to receive, from the multicast source, a data packet during the second time period. Similar to the data packet received during the first time period (at 402), the second data packet can be included in multicast data destined to devices in the IP domain. Thus, the second data packet also can be sent to the multicast router such that the second data packet can be forwarded by the multicast router to devices in the IP domain.

Because the multicast-router interface associated with the multicast router was changed from the first port to the second port (at 408), the access switch can be configured to send the second data packet to the multicast router during the second time period via a data path including the second port from the set of ports, at 412. Specifically, the access switch can be configured to send the second data packet to the multicast router during the second time period via the second port.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. An apparatus, comprising:
    an access switch having a set of ports, the access switch configured to be operatively coupled to a multicast router via a data path including a first port from the set of ports, the access switch configured to be associated with a network associated with the multicast router, the access switch configured to designate the first port as a multicast-router interface,
    the access switch configured to send a message to the multicast router via each port from the set of ports in response to an indication of a change in a topology of the network, the access switch configured to de-designate the first port as the multicast-router interface and to not designate the second port as the multicast-router interface in the absence of a signal from the multicast router being received at the first port and the second port in response to the message.

2. The apparatus of claim 1, wherein the message is an Internet Group Management Protocol (IGMP) group-specific query.

3. The apparatus of claim 1, wherein the message is a Multicast Listener Discovery (MLD) query.

4. The apparatus of claim 1, wherein the access switch is configured to receive the indication of the change in the topology in response to at least one of an active Spanning Tree Protocol (STP) port failing or a new active STP port being activated.

5. The apparatus of claim 1, wherein the access switch is configured to send the message to the multicast router via each port from the set of ports based on each port from the set of ports being in a Spanning Tree Protocol (STP) forward (FWD) state.

6. The apparatus of claim 1, wherein the access switch is configured to receive the indication of the change in the topology of the network prior to sending the message.

7. The apparatus of claim 1, wherein the access switch is configured to generate the indication of the change in the topology of the network prior to sending the message.

8. The apparatus of claim 1, wherein the access switch is configured to be associated with a network including a plurality of network nodes, the access switch is configured to send a plurality of instances of the message such that each network node from the plurality of network nodes receives an instance of the message.

9. A method, comprising:
    receiving, at a first multicast-router interface of an access switch, an indication of a change in a network topology;
    sending, from each of a plurality of ports associated with the access switch, a message to a multicast router in response to receiving the indication of the change in the network topology;
    de-designating the first multicast-router interface of the access switch in response to receiving the indication of the change in the network topology;
    designating a port from the plurality of ports as a second multicast-router interface when that port receives a response to the message; and
    determining not to designate that port as a second multicast-router interface in the absence of a response to the message being received at that port.

10. The method of claim 9, wherein the change in the network topology is associated with an error at the port.

11. The method of claim 9, wherein the indication of the change in the network topology is a Spanning Tree Protocol (STP) Topology Change Notification (TCN).

12. The method of claim 9, wherein the message is an Internet Group Management Protocol (IGMP) group-specific query.

13. The method of claim 9, wherein the message is a Multicast Listener Discovery (MLD) query.

14. The method of claim 9, wherein the access switch is configured to generate the indication of the change in the network topology prior to sending the message.

15. The method of claim 9, wherein the access switch is configured to be associated with a network including a plurality of network nodes, the access switch is configured to send a plurality of instances of the message such that each network node from the plurality of network nodes receives an instance of the message from the plurality of instances.

16. A non-transitory processor-readable medium storing code representing instructions to be executed by a processor, the code comprising code to cause the processor to:
    receive an indication of a change in a network topology;
    send, from each of a plurality of ports associated with an access switch, a message to a multicast router in response to receiving the indication of the change in the network topology;
    de-designate a first multicast-router interface of the access switch in response to receiving the indication of the change in the network topology;
    designate a port from the plurality of ports as a second multicast-router interface when that port receives a response to the message; and
    determine not to designate that port as a second multicast-router interface in the absence of a response to the message being received at that port.

17. The non-transitory processor-readable medium of claim 16, wherein the change in the network topology is associated with an error at the port.

18. The non-transitory processor-readable medium of claim 16, wherein the indication of the change in the network topology is a Spanning Tree Protocol (STP) Topology Change Notification (TCN).

19. The non-transitory processor-readable medium of claim 16, wherein the access switch is configured to generate the indication of the change in the network topology prior to sending the message.

20. The non-transitory processor-readable medium of claim 16, wherein the access switch is configured to be associated with a network including a plurality of network nodes, the access switch is configured to send a plurality of instances of the message such that each network node from the plurality of network nodes receives an instance of the message from the plurality of instances.

\* \* \* \* \*